Jan. 10, 1967  H. BARSCH  3,296,709
ROTARY DRIER
Filed Aug. 1, 1963  2 Sheets-Sheet 1
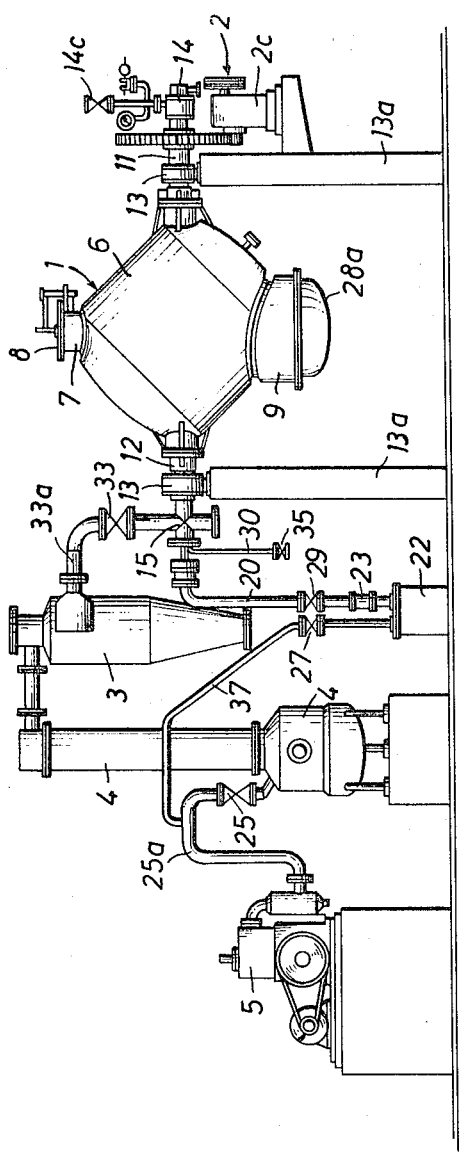
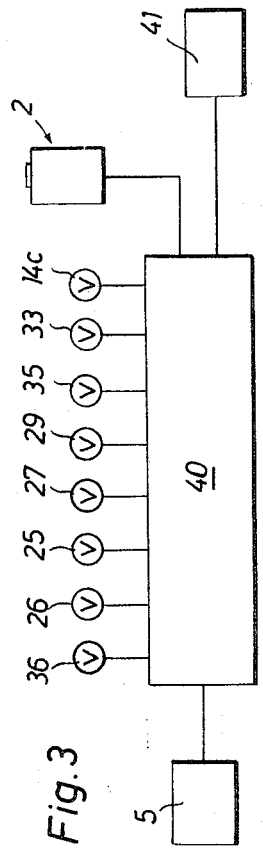
INVENTOR:
HERMANN BARSCH
BY
Michael S. Striker
his ATTORNEY INVENTOR:
HERMANN BARSCH
BY
Michael S. Striker
his ATTORNEY United States Patent Office 3,296,709
Patented Jan. 10, 1967

3,296,709
ROTARY DRIER
Hermann Barsch, Remscheid-Lennep, Germany, assignor to Haas Vakuum-Technik G.m.b.H., Remscheid-Lennep, Germany
Filed Aug. 1, 1963, Ser. No. 299,320
Claims priority, application Germany, Aug. 3, 1962, H 46,545
10 Claims. (Cl. 34—82)

The present invention relates to rotary driers in general, and more particularly to an improved rotary batch drier whose container performs a tumbling or wobbling movement while the material to be dried is maintained at subatmospheric pressure.

It is an important object of my invention to provide an improved rotary vacuum drier whose material receivin container permits intermitent or continuous introduction or withdrawal of substances other than the material to be dried so that such material may be subjected to additional treatments prior to, during and/or subsequent to the drying operation.

Another object of the invention is to provide a rotary vacuum drier of the just outlined characteristics which is constructed and assembled in such a way that the drying step may be completed within short periods of time, that the liquid and/or gaseous matter which is being separated from the solid phase may be withdrawn on a continuous basis, and that the fluids separated from the material to be treated contain negligible quantities of solid ingredients.

A further object of the invention is to provide a rotary drier which may serve a series of additional purposes, such as washing, mixing, filtrating and/or heating or cooling of the material to be dried and wherein such additional treatments may be carried out prior to, during or subsequent to the drying step.

An additional object of the invention is to provide a rotary drier wherein the material to be dried may be subjected to a series of additional treatments in a predetermined sequence and in a fully automatic way.

A concomitant object of the invention is to provide a novel method of treating a material which is to be dried or which is being or has been dried in the container of a rotary vacuum drier, according to which the treatment may be carried out in the same container in which the material is dried so that the material is transferred only once to and from the drying container.

With the above objects in view, one feature of my invention resides in the provision of a drier installation in which a moisture containing solid material is dried by simultaneous generation of vapors and in which such material is otherwise treated in the presence of fluid and/or comminuted solid treating substances. The installation comprises a rotary container defining a material receiving chamber, a vapors evacuating pipe extending into the chamber, and conveying means communicating with the chamber to deliver and to withdraw material and treating substances from the container.

In accordance with another feature of the invention, the container comprises a hollow portion which is located at one side of the axis about which the container rotates and a filter including a perforated wall which separates the interior of this hollow portion from the remainder of the container so that the interior of the hollow portion forms a compartment which receives fluid matter admitted into the remainder of the chamber and passing through the filter. The conveying means comprises a conduit which extends into the compartment to withdraw the fluid matter therefrom, and this conduit preferably extends through the filter and into the remainder of the chamber to pass through the vapors evacuating pipe which extends through one of the trunnions forming part of the container and defining a fixed axis around which the container rotates. The pipe and the conduit may be connected with a vacuum pump or with another vacuum generating device and the flow of vapors and fluid matter is controlled by suitable valves. In accordance with a preferred embodiment of the invention, the connection between the discharge end of the vapors evacuating pipe and the vacuum generating device includes a dust separator and a surface condenser, and the connection between the conduit and the vacuum generating device comprises a receiver for fluid matter which may be provided with an observation window.

Certain other features of the invention reside in the provision of a heating or cooling jacket which may receive fluid through the other trunnion of the container, in the provision of additional conduit means for delivery or evacuation of fluid and/or comminuted solid matter from the container, and in the provision of a control system which may regulate the operation of the drier installation in such a way that various treatments including the heating step may be carried out in a predetermined sequence either automatically or at the discretion of an operator.

The novel features which are considered as characteristic of the invention are set forth in particular in the appended claims. The improved drier itself, however, both as to its construction and its method of operation, together with additional features and advantages thereof, will be best understood from the following detailed description of certain specific embodiments with reference to the accompanying drawings, in which:

FIG. 1 is a schematic side elevational view of a vacuum drier installation which embodies my invention;

FIG. 3 is a somewhat schematic elevational view of a control system which serves to operate the vacuum drier installation of my invention in accordance with a predetermined schedule.

Figure 2:
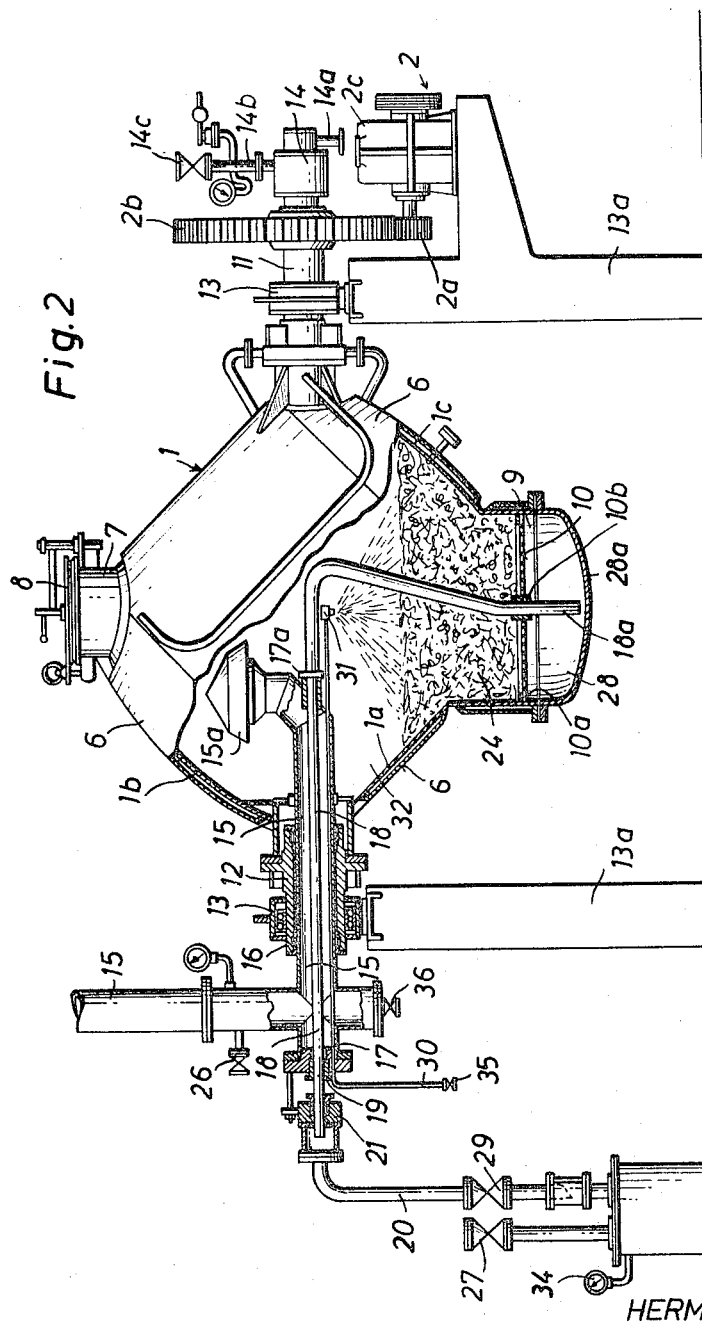
FIG. 2 is an enlarged detail view of a portion of the vacuum drier installation shown in FIG. 1, a portion of the material receiving container and certain other parts of the installation being shown in section.

Referring to the drawings, and first to FIG 1, there is shown a vacuum drier installation which comprises a vacuum drier including a material receiving container 1, a drive 2 including an electric motor 2c which serves to rotate the container about a horizontal axis, a dust collector 3 which may assume the form of a cyclone separator, a vacuum surface condenser 4, and a vacuum pump 5.

The container 1 comprises a cylindrical median portion 1a and two slightly concavo-convex covers 1b, 1c (see FIG. 2). The axis of the median portion 1a is inclined with reference to a horizontal plane and the container is mounted to rotate about the fixed axis of two hollow horizontal trunnions 11, 12. The fixed axis extends substantially diagonally of the median portion 1a so that the container performs a wobbling or tumbling movement when the trunnion 11 is rotated by the drive 2 through a pair of reducing gears 2a, 2b. The extent of such wobbling movement is determined by the ratio of the axial length to the diameter of the median portion 1a. The container 1 defines an internal chamber 32 which receives the material 24 to be dried.

The entire container is surrounded by a heating or cooling jacket 6. The heating or cooling fluid is admitted or withdrawn through the trunnion 11 which communicates with a header 14 provided with an outlet 14a and an intake 14b controlled by a valve 14c. The container 1 is provided with a tubular inlet 7 which is sealable by a lid 8 and with a hollow portion in the form of a tubular extension 9 which is located diametrically opposite the inlet 7 and which accommodates a detachable filter or sieve here shown as a perforated wall 10. The annular frame 10a of this wall is detachably secured to the extension 9 so that it may be removed or exchanged with little loss in time. This wall 10 may consist of one or more metallic, plastic and/or textile layers, depending on the nature of the material 24. The interior of the hollow tubular extension 9 forms a compartment 28 which constitutes a part of the chamber 32 and which is separated from the remainder of this chamber by the wall 10.

The trunnions 11, 12 are mounted to rotate in two bearings 13 which are mounted on uprights 13a forming part of the main frame of the drier installation. This frame 13a also supports the motor 2c of the drive 2. A vapors evacuating pipe 15 extends coaxially through the left-hand trunnion 12 and into the chamber 32 of the container 1. The pipe 15 is held against rotation and its right-hand end portion which is accommodated in the chamber 32 is bent upwardly to support a suitable bonnet 15a which prevents the entry of solid material but which cannot hinder the entry of vapors. A stuffing box 16 serves to prevent escape of vapors to the atmosphere by providing an airtight seal between the periphery of the pipe 15 and the left-hand trunnion 12. The left-hand end of the pipe 15 communicates with the vacuum pump 5 via cyclone 3 and condenser 4, see FIG. 1. The conduitry connecting the pipe 15 with the vacuum pump 5 comprises a series of suitable valves which will be described later.

The pipe 15 accommodates a portion of a liquid filtrate evacuating conduit 18 which extends through a pair of stuffing boxes 17, 17a and whose right-hand end portion is bent radially with reference to the common axis of the trunnions 11, 12 so as to extend through the chamber 32, through the material 24, through a suitable sealing sleeve 10b of the perforated wall 10, and into the filtrate collecting compartment 28 which is disposed between the outer side of the wall 10 and a cupped cap 28a sealingly fixed to the open end of the tubular extension 9. The intake end 18a of the conduit 18 serves to receive liquid or gaseous filtrate from the compartment 28 and to convey such filtrate into a connecting conduit 20 which is coupled to the discharge end of the conduit 18 by a stuffing box 21. The conduit 20 leads to a receiver in the form of a collecting main 22 which is connected with the vacuum pump 5 by a conduit 37 containing a shutoff valve 27. The conduit 20 accommodates a shutoff valve 29 and an observation window 23. A manometer 34 which is connected to the receiver 22 enables an operator to determine the magnitude of pressure prevailing in the receiver and in the conduit 18 when the valve 29 is open. The window 23 may be provided in the receiver 22 if desired.

In accordance with another feature of my invention, the installation of FIGS. 1 and 2 may comprise one or more additional valve-controlled conduits which serve to admit and/or to evacuate solid, liquid and/or gaseous substances from the chamber 32 of the container 1. One such conduit 30 extends through the vapor evacuating pipe 15 and its intake end is connected to a valve 35 which may be secured to a pressurized receptacle or to a pump for a liquid substance, not shown. The discharge end of the conduit 30 extends into the chamber 32 and carries a spray nozzle 31 which discharges jets of a liquid substance onto the surface of the material 24 whereby such substance flows through the material and through the wall 10 to accumulate in the compartment 28 and to be withdrawn through the intake end 18a of the conduit 18.

Additional treating substances may be admitted through the valves 26, 36 (see FIG. 1) and through the vapor pipe 15. A valve 25 serves to control the flow of fluid in the conduit 25a between the intake of the pump 5 and the surface condenser 4, and a further valve 33 is provided in the conduit 33a leading from the discharge end of the vapor pipe 15 to the cyclone 3.

The installation of my invention operates as follows:

In the first step, the drive 2 is operated to move the container 1 to the position of FIG. 2 so that the inlet 7 (which also serves for evacuation of dried material) is located at the uppermost point of the container. The lid 8 is detached or is pivoted to its open position so that the operator may introduce a requisite quantity of material 24 into the chamber 32. The material drops onto and comes to rest on the perforated wall 10. In the next step, the operator closes the valve 25 in the conduit 25a and opens the valve 26 so that the interior of the container is maintained at atmospheric pressure. The operator also opens the valves 27 and 29 so that the conduit 18a may withdraw liquid filtrate from the compartment 28 because this compartment now communicates with the suction side of the pump 5 via conduits 25a, 20 and 37. The valves 27, 29 permit regulation of suction in the compartment 28, and the extent of such suction can be read on the scale of the manometer 34. The outflow of filtrate may be observed through the window 23. When the withdrawal of filtrate is completed, the operator closes the valves 27, 29 to begin the drying operation.

In order to start the drying operation, the person in charge closes the lid 8 and starts the drive 2 so that the container begins to rotate about the common axis of the trunnions 11, 12. The valve 26 is closed and the shutoff valve 25 is opened so that the pipe 15 begins to withdraw vapors from the chamber 32. The vapors are led through the cyclone 3 and are condensed in the surface condenser 4.

In many instances, it is necessary to subject the material 24 to additional treatment, for example, subsequent to withdrawal of filtrate but prior to the drying operation. Thus, the container 1 may be held in the position of FIG. 1 while the operator admits a washing fluid through the inlet 7 and/or through the nozzle 31. The washing fluid flows through the material 24 and accumulates in the compartment 28 to be withdrawn through the conduit 18. Of course, it is also possible to introduce a predetermined quantity of washing liquid, to thereupon close the lid 8, and to rotate the container 1 for a given period of time in order to bring all particles of the material into intimate contact with the washing liquid. The container is then arrested, and the washing liquid which flows through the wall 10 is evacuated via conduit 18. Alternatively, the washing fluid may remain in the container during the drying step and is withdrawn through the pipe 15 in the form of steam or vapor.

Upon completion of the drying operation which may be carried out while the container is heated or cooled by fluid admitted through the header 14, the operator arrests the drive 2 in a position in which the inlet 7 is located at the lowermost point of the container so that the material may be evacuated by gravity flow. Of course, the jacket 6 may receive a coolant during the filtering step, i.e., when the filtrate is being withdrawn through the conduit 18, and it is equally possible to cool the dried end product prior to its evacuation from the chamber 32 so that the drying operation is carried out first in the presence of heat and thereupon in the presence of coolant. Furthermore, comminuted, pulverulent or granular solids may be added to the material 24 while the container is at a standstill or while the container rotates, depending on the nature of the mixture and on the desired mixing effect.

By way of example, the apparatus of my invention may be used to carry out the following operation: In the first step, an organic acid is washed with a solvent. In the next step, a soda solution is added together with a suitable solvent. The organic acid forms a sodium salt which is washed with a solvent. The solvent may be heptane. In the final step, the material is dried in the previously described manner.

Referring to FIG. 3, there is shown a portion of a modified vacuum drier installation which comprises a control system including a control element 40 serving to operate the installation in a predetermined sequence and in a fully automatic way. This control element 40 is constructed in such a way that it admits a given fluid through the nozzle 31 (valve 35) at a predetermined stage of the operation; in addition, the control element may regulate the inflow and/or outflow of additional fluids whenever the operation is a complex one and requires addition of several solvents, washing media, comminuted substances and the like. The control element 40 further starts or arrests the drive 2 to maintain the container 1 in rotation for predetermined periods of time, and controls the inflow or outflow of fluid from the jacket 6 (valve 14c). In the illustrated embodiment, the control element 40 is assumed to comprise a series of cams which regulate, among others, the inflow of fluid through the nozzle 31 (such inflow may take place once or more than once, for example, when the material 24 must be subjected to repeated washing, wetting or similar action), the drive 2, the flow of fluid from the header 14 to the jacket 6, the valves 25, 27, 29 and 33, the valves 26, 36 and the pump 5. This control element may be constructed in such a way that the material 24 is automatically subjected to additional treatment subsequent to completion of the drying step.

If desired, the control element may comprise a series of switches, relays, time lag relays and other current consuming devices. Also, a hydraulic or pneumatic control system may be used as a substitute for as a part of a mechanical or electrical control system.

It goes without saying that the installation of my invention may comprise a compressor which can be connected to the container 1 to speed up the expulsion of fluids into the compartment 28. A compressor 41 is shown schematically in FIG. 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention, and, therefore, such adaptations should and are intended to be comprehended within the meaning and range of equivalence of the following claims.

What is claimed as new and desired to be secured by Letters Patent is:

1. A drier installation in which a batch of moisture containing solid material is dried by simultaneous generation of vapors and in which such material is otherwise treated in the presence of fluid and/or solid treating substances, comprising a container defining a material receiving chamber and arranged to rotate about a fixed axis, said container comprising a hollow portion located at one side of said axis and a fluid permeable wall spaced from said axis and separating the interior of said hollow portion from the remainder of said chamber so that such interior forms a compartment which may receive fluid matter admitted into the remainder of said chamber and passing through said wall, said hollow portion forming in a predetermined position of said rotary container the lowermost portion of said chamber; inlet means provided on said container for admission of material into the remainder of said chamber; conduit means rotatable with said container about said fixed axis and communicating with said compartment for withdrawing fluid matter from said compartment, said conduit means having an inlet end opening in said compartment and an outlet end located outside of said receiving chamber, and said conduit means including a portion whose axis substantially coincides with said fixed axis; and suction creating means connected to said outlet end of said conduit means.

2. A drier installation in which a batch of moisture containing solid material is dried by simultaneous generation of vapors and in which such material is otherwise treated in the presence of fluid and/or solid treating substances, comprising a container defining a material receiving chamber and arranged to rotate about a fixed axis, said container comprising a hollow portion located at one side of said axis and a filter including a fluid permeable wall spaced from said axis and separating the interior of said hollow portion from the remainder of said chamber so that such interior forms a compartment which may receive fluid matter admitted into the remainder of said chamber and passing through said wall, said filter further comprising a frame for said wall and said frame being detachably fixed to said hollow portion, said hollow portion forming in a predetermined position of said rotary container the lowermost portion of said chamber; inlet means provided on said container for admission of material into the remainder of said chamber; a vapor evacuating suction pipe extending into said chamber; conduit means rotatable with said container about said fixed axis and communicating with said compartment for withdrawing fluid matter from said compartment, said conduit means having an inlet end opening in said compartment and an outlet end located outside of said receiving chamber, and said conduit means including a portion whose axis substantially coincides with said fixed axis; and suction creating means connected to said outlet end of said conduit means.

3. A drier installation in which a batch of moisture containing solid material is dried by simultaneous generation of vapors and in which such material is otherwise treated in the presence of fluid and/or solid treating substances, comprising a container defining a material receiving chamber and arranged to rotate about a fixed axis, said container comprising a hollow portion located at one side of said axis and a fluid permeable wall spaced from said axis and separating the interior of said hollow portion from the remainder of said chamber so that such interior forms a compartment which may receive fluid matter admitted into the remainder of said chamber and passing through said wall, said hollow portion forming in a predetermined position of said rotary container the lowermost portion of said chamber; inlet means provided on said container for admission of material into the remainder of said chamber; a vapor evacuating suction pipe extending into said chamber substantially coaxially with respect to said fixed axis; and conduit means for withdrawing fluid matter from said compartment, said conduit means extending through said wall into the remainder of said chamber and through said pipe and having an intake end in said compartment rotatable therewith and a stationary outlet end outside of said chamber spaced from said container.

4. A vacuum drier installation in which a moisture containing solid material is dried by simultaneous generation of vapors and in which such material is otherwise treated in the presence of fluid and/or comminuted solid treating substances, comprising a rotary container defining a material receiving chamber and including a pair of trunnions having a common axis around which the container may rotate, said container further including a hollow portion and a perforated wall spaced from said axis and separating the interior of said hollow portion from the remainder of said chamber so that such interior forms a compartment which may receive fluid matter admitted into the remainder of said chamber and passing through said wall, said hollow portion forming in a predetermined position of said rotary container the lowermost portion of said chamber; a drive for rotating the container about said common axis; a stationary vapor evacuating pipe extending through one of said trunnions and into the remainder of said chamber; a sealable inlet arranged to admit material into the remainder of said chamber; valved conduit means rotatable with said container about said common axis and communicating with said compartment for withdrawing fluid matter from said compartment, said conduit means having an inlet end opening in said compartment and an outlet end located outside of said receiving chamber, and said conduit means including a portion whose axis substantially coincides with said common axis; a vacuum generating device connected with said conduit means so that the evacuation of fluid matter is effected by suction.

5. A vacuum drier installation in which a moisture containing solid material is dried by simultaneous generation of vapors and wherein such material is otherwise treated in the presence of fluid and/or comminuted solid treating substances; comprising a rotary container defining a material receiving chamber and comprising a hollow portion and filter means separating the interior of said hollow portion from the remainder of said chamber; adjustable drive means for rotating said container about a fixed axis which is spaced from said hollow portion, said hollow portion forming in a predetermined position of said rotary container the lowermost portion of said chamber; material admitting and evacuating inlet means provided in said container; a vapor evacuating pipe including a portion extending substantially parallel to said fixed axis into the remainder of said container; pump means connected with said pipe; adjustable valve means provided in the connection between said pump means and said pipe; a first conduit connected with said pump means and having an intake end extending into said hollow portion and rotatable therewith; stationary adjustable valve means in said first conduit exteriorily of said container; a second conduit extending into said container to deliver treating matter into the remainder of said chamber; adjustable valve means provided in said second conduit; and control means operatively connected with said drive means and with said valve means to adjust the same in a predetermined sequence.

6. A vacuum drier installation in which a moisture containing solid material is dried by simultaneous generation of vapors and wherein such material is otherwise treated in the presence of fluid and/or comminuted solid treating substances; comprising a rotary container defining a material receiving chamber and comprising a hollow portion and filter means including a fluid permeable wall separating the interior of said hollow portion from the remainder of said chamber, said hollow portion forming in a predetermined position of said rotary container the lowermost portion of said chamber so that such interior forms a compartment which may receive fluid matter admitted into the remainder of said chamber and passing through said filter means; adjustable drive means for rotating said container about a fixed axis which is spaced from said hollow portion; material admitting and evacuating inlet means provided in said container; a vapor evacuating pipe extending into the remainder of said container; pump means connected with said pipe; adjustable valve means provided in the connection between said pump means and said pipe; a first conduit connected with said pump means, said first conduit extending through said wall and having an inlet end opening into said compartment and an outlet end located outside of said chamber, at least that portion of said first conduit which is located at the interior of said chamber being rotatable with said container; adjustable valve means in said first conduit; a second conduit extending into said container to deliver treating matter into the remainder of said chamber; adjustable valve means provided in said second conduit; and automatic control means operatively connected with said drive means and with said valve means to adjust the same in a predetermined sequence so that said valve means may permit entry and evacuation of treating substances and that said drive means may rotate the container in a fully automatic way.

7. A vacuum drier installation in which a moisture containing solid material is dried by simultaneous generation of vapors and wherein such material is otherwise treated in the presence of fluid and/or comminuted solid treating substances, comprising a rotary container having a cylindrical portion and defining a material receiving chamber; adjustable drive means for rotating the container about a fixed axis which is inclined with a reference to the axis of said cylindrical portion so that the container performs a tumbling movement during rotation thereof; filter means including a fluid permeable wall provided in said container spaced from said fixed axis to separate a portion of said chamber from the remainder thereof whereby a fluid admitted to the remainder of said chamber and passing through said filter may accumulate in said portion of the chamber; a vapor evacuating pipe having an intake located in the remainder of said chamber and including a portion located in said fixed axis and extending from said container; a fluid evacuating conduit extending through said pipe into the remainder of said chamber and through said filter to withdraw fluid from said portion of the chamber, fluid evacuating conduit extending through said wall and having an inlet end opening into said compartment and an outlet end located outside of said chamber, at least that portion of said fluid evacuating conduit which is located at the interior of said chamber being rotatable with said container; a suction pump connected with said pipe and with said conduit; a fluid admitting conduit including a portion which is parallel with said fixed axis and comprising a nozzle located in the remainder of said chamber; and a control system operatively connected with said drive means and arranged to regulate the flow of fluid matter through said pipe and said conduits.

8. A drier installation in which a batch of moisture containing solid material is dried by simultaneous generation of vapors and in which such material is otewise treated in the presence of fluid and/or solid treating substances, comprising a container defining a material receiving chamber and arranged to rotate about a fixed axis, said container comprising a hollow portion located at one side of said axis and a perforated wall spaced from said axis and separating the interior of said hollow portion from the remainder of said chamber so that such interior forms a compartment which may receive fluid matter admitted into the remainder of said chamber and passing through said wall, said hollow portion forming in a predetermined position of said rotary container the lowermost portion of said chamber; inlet means provided on said container for admission of material into the remainder of said chamber; a vapor evacuating suction pipe extending into said chamber; suction conduit means for withdrawing fluid matter from said compartment, said suction conduit means extending through said wall and having an inlet end opening into said compartment and an outlet end located outside of said chamber, at least that portion of said suction conduit means which is located at the interior of said chamber being rotatable with said container, and said conduit means including a portion whose axis substantially coincides with said fixed axis; suction creating means connected to said outlet end of said second conduit means; and additional conduit means including valve means for selectively admitting treating substances to the remainder of said chamber.

9. A vacuum drier installation in which a moisture-containing solid material is dried by simultaneous generation of vapors and in which such material is otherwise treated in the presence of fluid and/or comminuted solid treating substances, comprising a rotary container defining a material receiving chamber and including a pair of trunnions having a common horizontal axis around which the container may rotate, said container further including a hollow portion and a perforated wall spaced from said common axis and separating the interior of said hollow portion from the remainder of said chamber so that such interior forms a compartment which may receive fluid matter admitted into the remainder of said chamber and passing through said wall, said hollow portion forming in a predetermined position of said rotary container the lowermost portion of said chamber; a drive for rotating the container about said common axis; a stationary vapor evacuating pipe extending through one of said trunnions and into the remainder of said chamber, said pipe having an upwardly extending open-ended portion located in said container and a bonnet spaced from and located above said open-ended portion; a sealable inlet arranged opposite said wall to admit material into the remainder of said chamber and being spaced from said common axis; valved conduit means extending through one of said trunnions for withdrawing fluid matter from said compartment; a vacuum generating device connected with said conduit means so that the evacuation of fluid matter is effected by suction; a dust separator connected with said pipe; and a surface condenser connected with said dust separator and with said vacuum generating device so that said vacuum generating device may withdraw vapors from said chamber whereby the vapors pass through said dust separating device and are condensed in said condenser.

10. A vacuum drier installation in which a moisture containing solid material is dried by simultaneous generation of vapors and in which such material is otherwise treated in the presence of fluid and/or comminuted solid treating substances, comprising a rotary container defining a material receiving chamber and including a cylindrical portion and a pair of spaced hollow trunnions having a common axis around which the container rotates, said axis being inclined with reference to the axis of said cylindrical portion and said container further including sealable material admitting and evacuating inlet means disposed at one side of said horizontal axis and a hollow portion disposed substantially diametrically opposite said inlet means, said hollow portion forming in a predetermined position of said rotary container the lowermost portion of said chamber; a filter provided in said container to separate the interior of said hollow portion from the remainder of said chamber so that the interior of said hollow portion forms a compartment which accommodates fluid matter admitted to the remainder of said chamber and passing through said filter; drive means operatively connected with one of said trunnions to rotate the container; a fluid receiving jacket surrounding said container; first valved conduit means extending through said one trunnion and including a header communicating with said jacket to admit a cooling or heating fluid thereto; a vapor evacuating pipe extending through the other trunnion and having an intake end located in the remainder of said chamber; second valved conduit means extending through said other trunnion into the remainder of said chamber and through said filter to withdraw fluid matter from said compartment, said second conduit means having a portion extending substantially radially with reference to said common axis; suction means connected to said second valve conduit so as to be adapted to create suction in the same and thereby withdraw fluid matter from said compartment; and a third valved conduit means extending through said other trunnion and having a fluid discharging portion in the remainder of said chamber.

References Cited by the Examiner

UNITED STATES PATENTS

| | | | |
|---|---|---|---|
| 1,043,939 | 11/1912 | Isherwood | 210—358 |
| 1,299,254 | 4/1919 | Stamp | 34—141 |
| 2,023,468 | 12/1935 | Dietrich | 34—140 |
| 2,808,657 | 10/1957 | Osborne et al. | 34—140 |
| 3,109,718 | 11/1963 | Falla | 34—134 X |

MARTIN P. SCHWADRON, *Primary Examiner.*

JOHN F. O'CONNOR, FREDERICK L. MATTESON, JR., *Examiners.*

B. L. ADAMS, *Assistant Examiner.*